United States Patent [19]

Negishi

[11] Patent Number: 4,848,168

[45] Date of Patent: Jul. 18, 1989

[54] TRAVELING DEVICE MOVING ALONG ELONGATED MEMBER

[75] Inventor: Koichi Negishi, Kodaira, Japan

[73] Assignee: Bridgestone Corporation, Tokyo, Japan

[21] Appl. No.: 133,464

[22] Filed: Dec. 15, 1987

[30] Foreign Application Priority Data

Apr. 13, 1987 [JP] Japan ................................ 62-88896
Oct. 23, 1987 [JP] Japan ................................ 62-266644

[51] Int. Cl.$^4$ .......................................... F16L 55/00
[52] U.S. Cl. ........................................ 73/865.8; 92/92
[58] Field of Search ................ 73/432.1, 865.8, 866.5, 73/623; 33/125 B, 302, 141 G; 378/60; 358/100; 324/220; 105/365; 104/138.1, 138.2, 154, 155, 157, 158; 138/97; 254/134.6, 93 R, 93 HP, 93 H; 376/249; 175/73; 91/50; 92/48, 90, 91, 94, 92

[56] References Cited

U.S. PATENT DOCUMENTS

| | | | |
|---|---|---|---|
| 2,855,934 | 10/1958 | Daughaday, Jr. ............... | 254/134.6 |
| 4,195,529 | 4/1980 | Madoian et al. ............... | 324/220 |
| 4,372,161 | 2/1983 | de Buda et al. ............... | 73/866.5 |
| 4,522,129 | 6/1985 | Jerberyd ............... | 254/134.6 |
| 4,601,204 | 7/1986 | Fournot et al. ............... | 73/866.5 |
| 4,646,787 | 3/1987 | Rush et al. ............... | 73/866.5 |
| 4,733,603 | 3/1988 | Kokolj ............... | 92/92 |

FOREIGN PATENT DOCUMENTS 2356028 1/1978 France ................................ 92/90

*Primary Examiner*—Stewart J. Levy
*Assistant Examiner*—Robert R. Raevis
*Attorney, Agent, or Firm*—Sughrue, Mion, Zinn, Macpeak & Seas

[57] ABSTRACT

A traveling device traveling along an elongated tube or member has an elastic contractable body expanding in radial directions to cause a contractive force in axial directions when supplied with pressurized fluid into the body. Mounting members are connected to respective ends of the elastic contractable body, and elastic member are arranged between the mounting members causing force resisting to the contractive force of the elastic contractable body. An anchoring structure is fixed to the mounting members and expands when supplied with pressurized fluid into the anchoring structure. In case of a large diameter column or tube, the traveling device comprises a plurality of elastic contractable bodies and a pair of frames having a shape and a size encircling the column or enclosed in the tube other than the components above described. With this arrangement, the traveling device is caused to travel along the elongated member or in the tube by supplying the pressurized fluid into and exhausting from the elastic contractable body in connection with alternate supplying the pressurized fluid into the exhausting from the anchoring member.

5 Claims, 14 Drawing Sheets

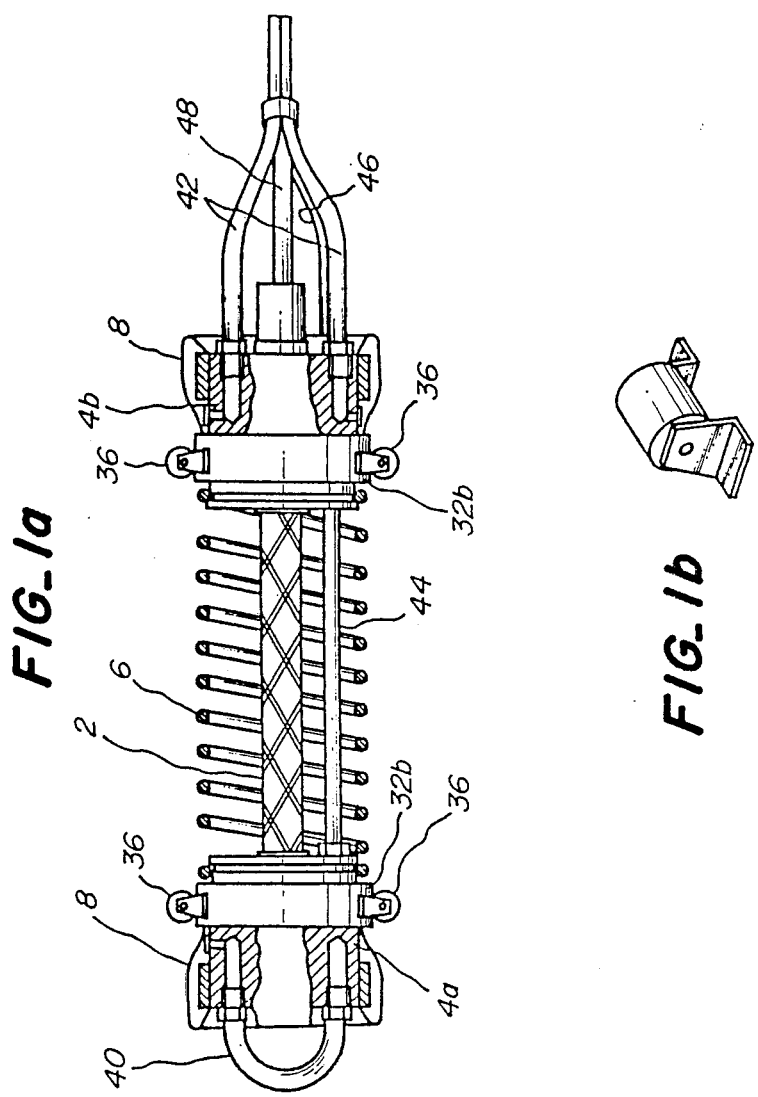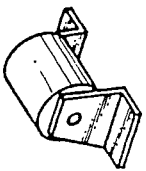

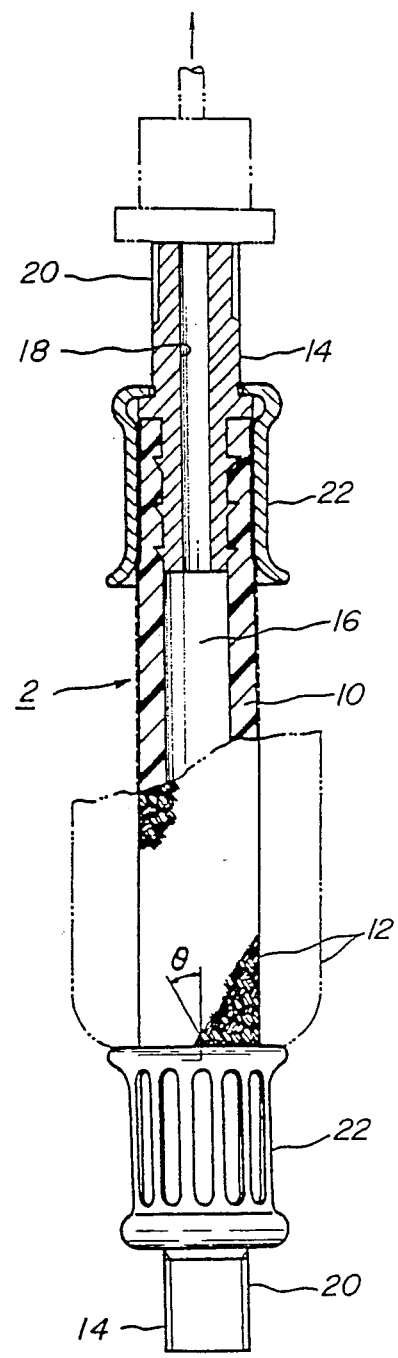
FIG_2a
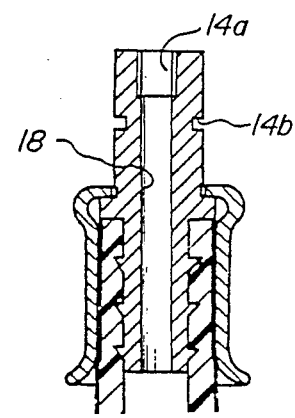
FIG_2b
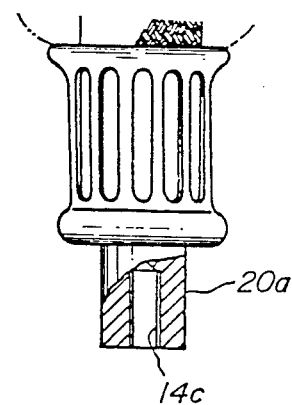
FIG_2c

FIG_3a
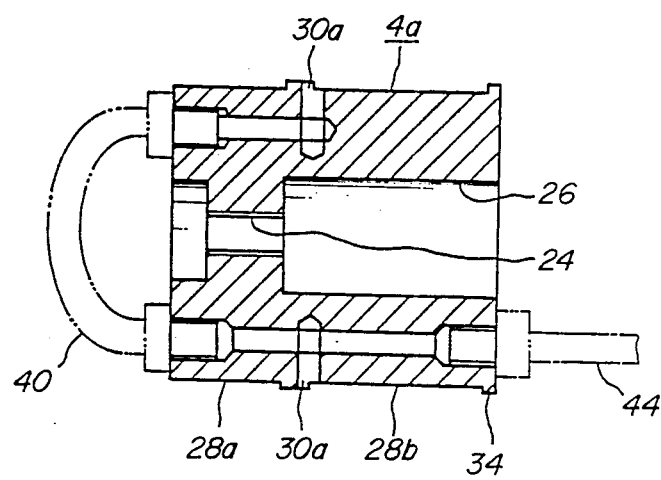
FIG_3b
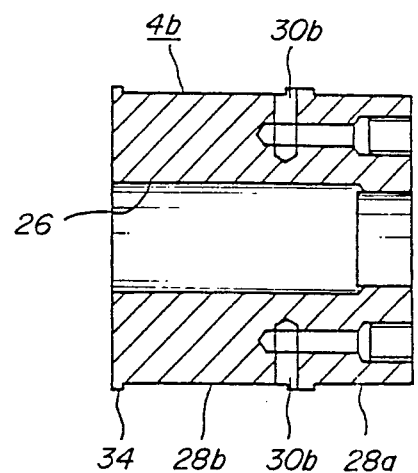

FIG_4a
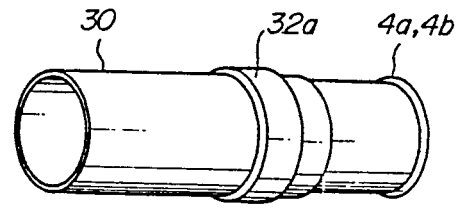
FIG_4b
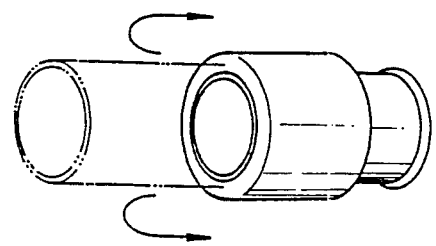
FIG_4c
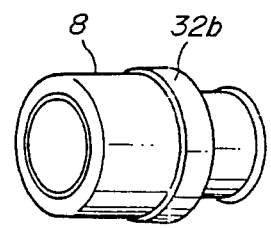

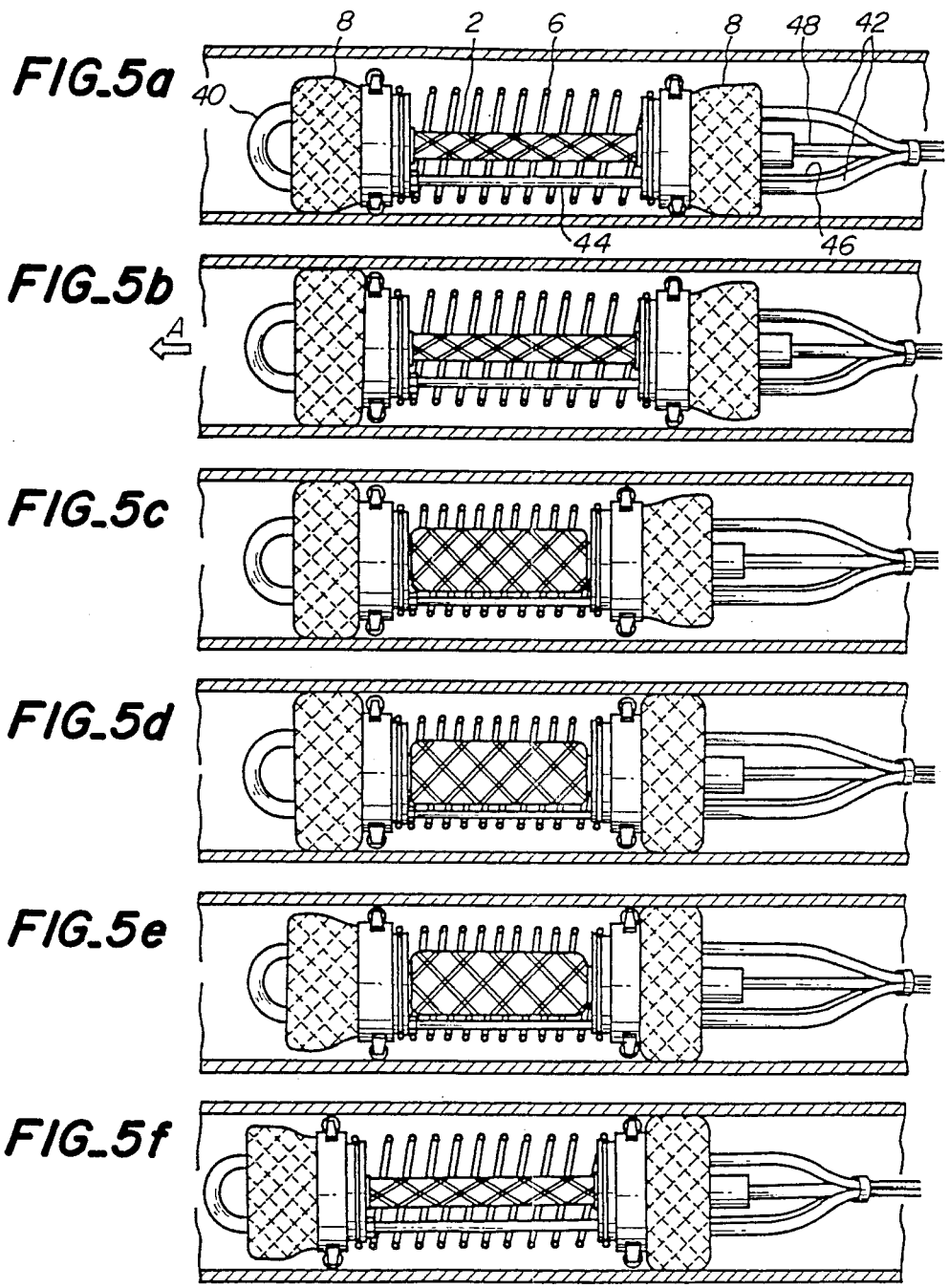

FIG_6a
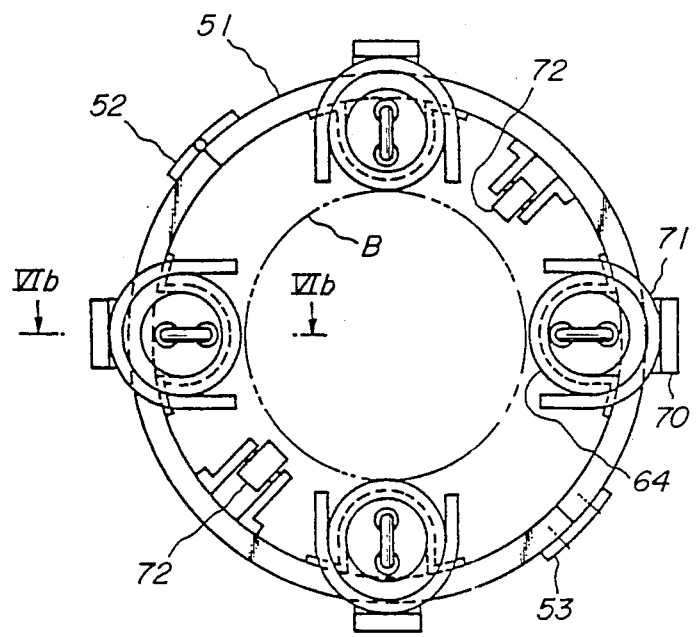
FIG_6b
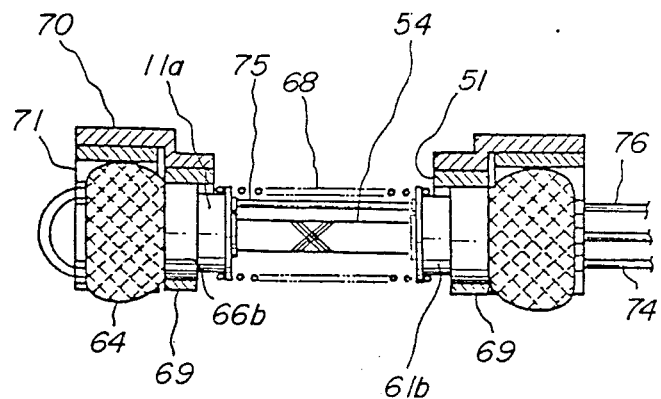

FIG_7a
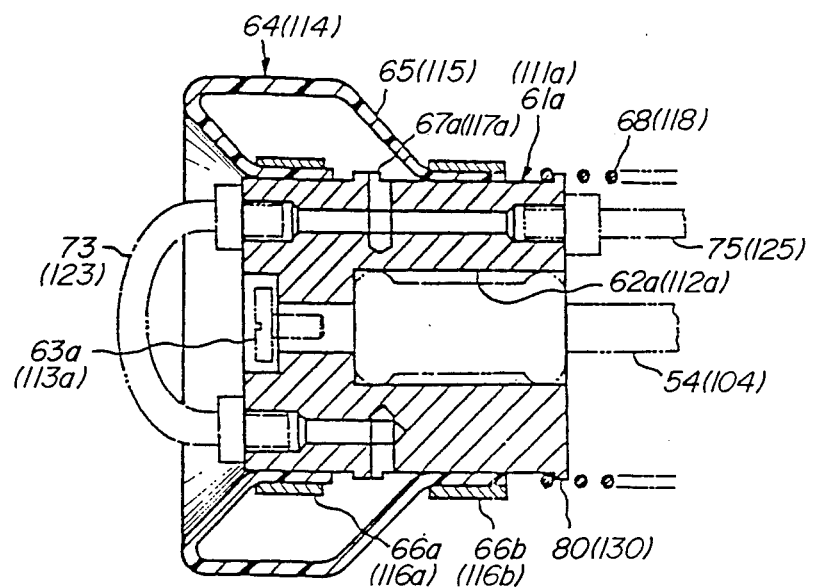
FIG_7b
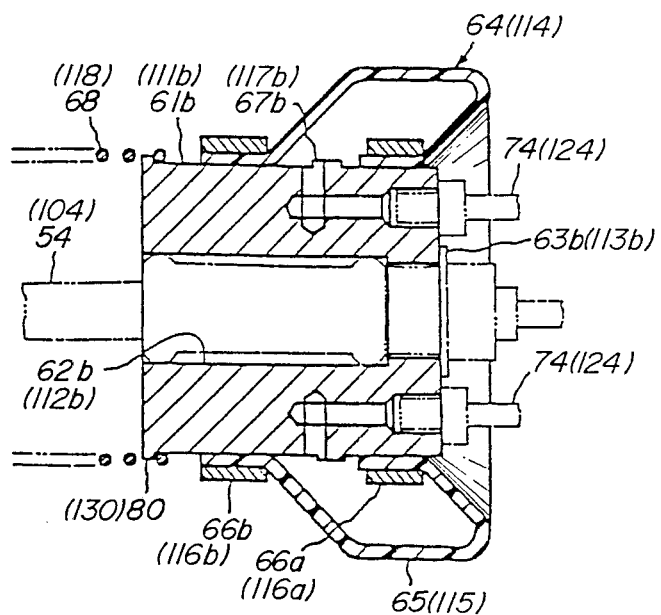

FIG_8a 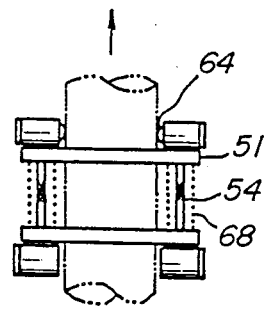
FIG_8b 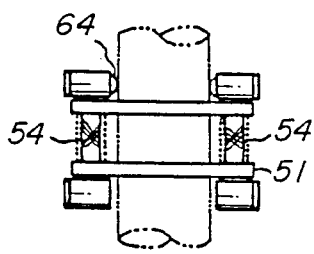
FIG_8c 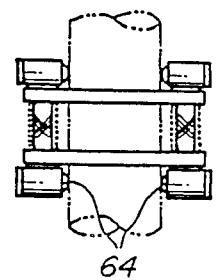
FIG_8d 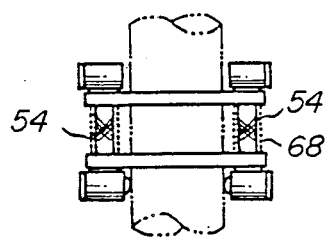
FIG_8e 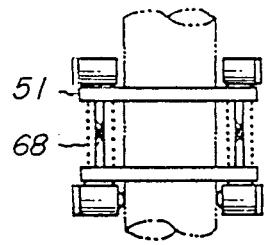

FIG_11a
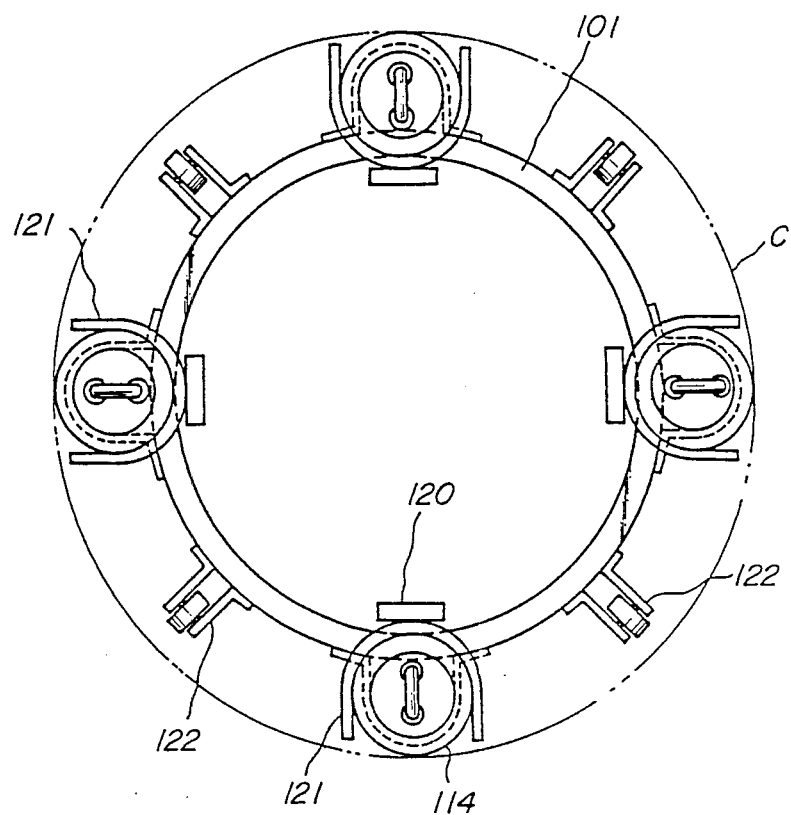
FIG_11b
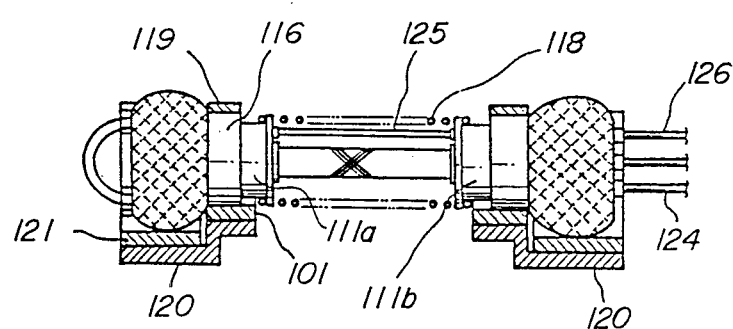

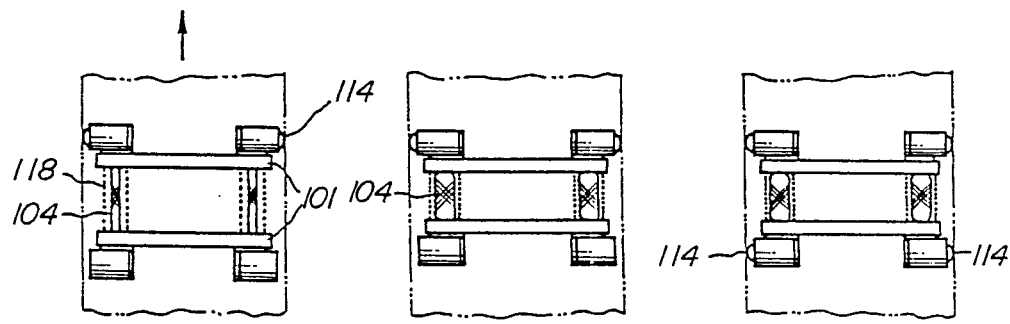
FIG_12a  FIG_12b  FIG_12c
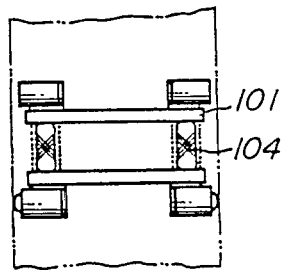
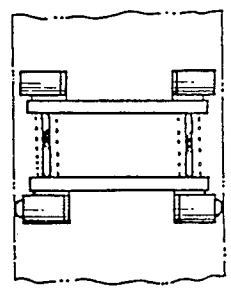
FIG_12d  FIG_12e

FIG_13
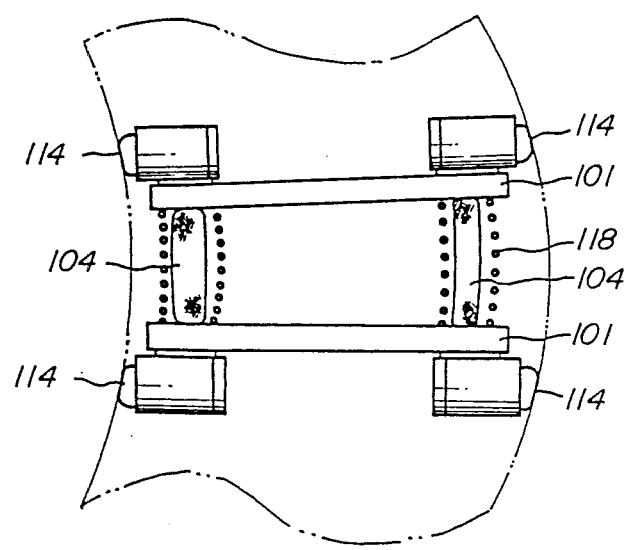

TRAVELING DEVICE MOVING ALONG ELONGATED MEMBER

BACKGROUND OF THE INVENTION

This invention relates to a traveling device advancing and retreating along a tubular or columnar member by alternately supplying and exhausting a pressurized fluid into and from an elastic contractable body. The body is adapted to cause a contractive force in its axial direction due to radial expansion when supplied with the pressurized fluid.

In chemical plants, nuclear power stations and the like, there are a great number of pipe lines connected for chemical reaction, energy conversion processes and the like. In order to make operate these plants safely and effectively, it is necessary to maintain and inspect these pipe lines periodically. Inspection in the pipe lines is also needed, as the case may be.

However, it is sometimes impossible for an operator to directly inspect the inside of the pipe lines due to their small inner diameters and external conditions.

In such a case, damage of the pipe lines and existence or amount of substances accumulated in the pipe lines have been inspected by a traveling device having wheels or pawls and driven by an electric or hydraulic motor, which was provided with a small type television camera or fiber scope.

With such a hitherto used traveling device, as the electric or hydraulic motor is used as driving means which is probably required to have speed reduction means, the traveling device is heavy and bulky so that applicable tubes are limited. In practice, applicable tubes are limited to those of $10^B-40^B$ (JIS G3452, nominal diameters: $10''-40''$). In the case of a traveling device having levers for embracing a tube line, it is exclusively applicable to only tube lines whose cross-sections are symmetrical such as circular cross-sections. In addition, such a traveling device cannot travel along an outside of a tube line due to grooves and protrusions formed on an outer surface of the tube line. Moreover, the traveling device is so heavy that it is only applicable to horizontal pipe lines or slightly inclined or curved portions of pipe lines. What is worse still, the electric or hydraulic motor as driving means tends to cause sparks and heating in operation so that the use of such a motor is disadvantageous in chemical plants including petroleum refineries treating inflammable or explosive materials.

In the case of inspecting outsides of long pipe lines or coating outer surfaces of chimneys in plants, scaffoldings are provided adjacent thereto, on which inspectors or workers stand.

However, assembling and disassembling of the scaffoldings are time-consuming and expensive operations. In addition, working on such scaffolding is often very dangerous because the scaffoldings are likely to undergo wind, vibrations and the like.

SUMMARY OF THE INVENTION

It is a primary object of the invention to provide a traveling device along an elongated member such as a pipe line or a column, which eliminates all the disadvantages of the prior art and is small and light, superior in explosion-proofness and which is applicable to tubes in a wide range such as those having various cross-sections or having grooves and protrusions on outer surfaces.

In order to achieve this object, the traveling device traveling along an elongated member according to the invention comprises an elastic contractable body expanding in radial directions to cause a contractive force in axial directions when supplied with pressurized fluid into the body, mounting members connected to respective ends of said elastic contractable body, an elastic member arranged between said mounting members causing force resisting to said contractive force of said elastic contractable body, and anchoring means fixed to said mounting members and expanding when supplied with pressurized fluid into said anchoring means, thereby causing the traveling device to travel along said elongated member by supplying the pressurized fluid into and exhausting from the elastic contractable body in connection with alternate supplying the pressurized fluid into and exhausting from the anchoring means.

In a second aspect of the invention, a traveling device traveling along an elongated member comprises a pair of frames having a shape and a size encircling said elongated member, at least one elastic contractable body having both ends connected to said pair of frames, respectively, and expanding in radial directions to cause contractive force in axial directions when supplied with pressurized fluid into the body, an elastic member deformable in response to contractive movement of the elastic contractable body, and anchoring means expandable at least inwardly of said frames to engage an outer surface of said elongated member when supplied with pressurized fluid into the anchoring means, thereby causing the traveling device to travel along said elongated member by supplying the pressurized fluid into and exhausting from the elastic contractable body in connection with alternate supplying the pressurized fluid into and exhausting from the anchoring means.

In a third aspect of the invention, a traveling device traveling along an elongated tube comprises a pair of frames having a shape and a size enclosed in said elongated tube, at least one elastic contractable body having both ends connected to said pair of frames, respectively, and expanding in radial directions to cause contractive force in axial directions when supplied with pressurized fluid into the body, an elastic member deformable in response to contractive movement of the elastic contractable body, and anchoring means expandable at least outwardly of said frames to engage an inner surface of said elongated tube when supplied with pressurized fluid into the anchoring means, thereby causing the traveling device to travel in said elongated tube by supplying the pressurized fluid into and exhausting from the elastic contractable body in connection with alternate supplying the pressurized fluid into and exhausting from the anchoring means.

With this arrangement, the pressurized fluid is supplied into the forward positioned anchoring means so as to expand to urge it against an inner surface of an elongated tube or an outer surface of a elongated member, whereby the anchoring means is fixed to the elongated tube or member. At this moment, the pressurized fluid is not supplied to the rearward positioned anchoring means.

The pressurized fluid is then supplied into the elastic contractable body which is expanded in radial directions to contract in axial direction against a force of the elastic member or a compression coil spring. However, as the forward positioned anchoring means is fixed to the elongated member, the rearward positioned frame is attracted in the forward direction by the con raction of the elastic contractable body whose one end is fixed to the frame.

After completion of the forward movement of the rearward positioned frame, the pressurized fluid is supplied into the rearward positioned anchoring means which is thus expanded and fixed to the elongated member. The pressurized fluid is exhausted from the forward positioned anchoring means and from the elastic contractable body, so that the forward positioned frame is advanced by release of the energy accumulated in the elastic member or the compression coil spring due to the contraction of the elastic contractable body.

Thereafter, the pressurized fluid is again supplied into the forward anchoring member which is thus expanded and fixed to the elongated member. In this manner, the pressurized fluid is supplied into and exhausted from the respective anchoring means and the elastic contractable body, respectively, in the sequence above described, thereby the traveling device is moved along the elongated member.

As can be seen from the above explanation, if it is desired to retraction the traveling device, the retract of the device can be accomplished only by changing the sequence for supplying and exhausting the pressurized fluid.

In order that the invention may be more clearly understood, preferred embodiments will be described, by way of example, with reference to the accompanying drawings.

BRIEF DESCRIPTION OF THE DRAWINGS

FIG. 1a is a front elevation, in partial section, of a traveling device traveling in an elongated tube;

FIG. 1b is a perspective view illustrating rolling means applicable to the traveling device shown in FIG. 1a;

FIG. 2a is a partial sectional view illustrating an elastic contractable body suitable for the traveling device according to the invention;

FIGS. 2b and 2c illustrate modifications of the elastic contractable body;

FIGS. 3a and 3b are sectional views illustrating mounting members used in the traveling device shown in FIG. 1a;

FIGS. 4a, 4b and 4c are perspective views for explaining steps of fixing the anchoring means to the mounting member;

FIGS. 5a-5f are views for explaining traveling operations of the device in a tube according to the invention;

FIG. 6a is a front view illustrating another embodiment of the invention;

FIG. 6b is a sectional view illustrating the traveling device shown in FIG. 6a;

FIGS. 7a and 7b are sectional views illustrating parts of the contractable body shown in FIG. 6a on enlarged scale;

FIGS. 8a-8e are views for explaining traveling operations of the device according to the invention;

FIG. 11a is a front elevation illustrating a further embodiment of the invention;

FIG. 11b is a partial sectional view illustrating the traveling device showing FIG. 11a;

FIGS. 12a-12e are views for explaining traveling operations of the device according to the invention;

FIG. 13 is a view for explaining the traveling of the device according to the invention in a curved tube.

DESCRIPTION OF THE PREFERRED EMBODIMENTS

Figure 9:
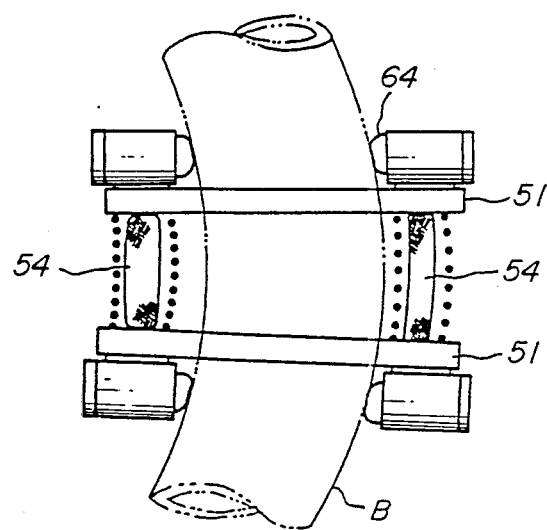
FIG. 9 is a view for explaining the traveling of the device according to the invention along a curved tube.

FIG. 1 is a front view illustrating in partial section a traveling device traveling in a pipe according to the invention. The device comprises an elastic contractable body 2, mounting members 4a and 4b integrally connected to ends of the contractable body 2, a compression coil spring 6 as an elastic member and anchoring means 8 fixed to the mounting members 4a and 4b.

As shown in FIG. 2a, the elastic contractable body 2 comprises a tubular body 10 made of rubber or a rubber-like elastomer covered by a reinforcing braided structure 12 made of preferably high tensile strength fibers and closed at ends by closure members 14. At least one of the closure members 14 is formed with a connecting aperture 18 communicating with an inner cavity 16 in the tubular body 10. Reference numeral 20 denotes male screws or external thread portions which serve to secure the mounting members to the elastic contractable body 2. Clamp sleeves 22 serve to prevent the tubular body and the braided structure from being dislodged from the closure members.

Connected to the connecting aperture 18 is a pipe line including a pressure source (not shown) for operation, for example, an air compressor and a three-way valve. When compressed air is supplied through the pipe line into the inner cavity 16, the elastic contractable body 2 is expanded in diameter to cause a contractive force in its axial directions. On the other hand, when the compressed air is exhausted from the inner cavity, the elastic contractable body 2 regains its initial length with the aid of its elasticity.

FIGS. 2b and 2c illustrate a slight modification of one end of the closure member 14 wherein the end is formed with a female screw or internal thread portion 14a for facilitating the connection of the pipe line from the pressure source and with an annular groove 14b for receiving a snap ring for fixing one end of the elastic contractable body 2. In FIG. 2c, reference numeral 14c denotes a female screw or internal thread portion formed in one end 20a of the elastic contractable body 2.

To the ends of the elastic contractable body 2 shown in FIG. 2a are connected through the closure members 14 the mounting members 4a whose section are shown in FIGS. 3a and 3b. The mounting member 4a shown in FIG. 3a includes a female screw or internal thread portion 24 adapted to engage the male screw portion 20 of one of the closure members, and an aperture 26 for receiving one part of the clamp sleeve 22. The mounting member 4b shown in FIG. 3b includes also an aperture 26 for receiving one part of the other clamp sleeve 22. The aperture 26 has a connecting aperture connecting therewith. Into the connecting aperture is inserted the closure member 14 other than the closure member 14 having the male screw portion 20. Onto the male screw portion 20, extending from the mounting member 4b, a coupling shown in phantom lines in FIG. 2a is screw-threaded to integrally connected it to the elastic contractable body.

Moreover, mounting members 4a and 4b include on their sides joint surfaces 28a for fixing thereon the anchoring structure 8 which is expandable when supplying a pressurized fluid. In this embodiment, as schematically shown in FIG. 4a, a tubular body 30 made of rubber or a rubber-like elastomer is mounted on the joint surface 28a of the mounting member 4a or 4b, and the clamp sleeve 32a is fitted on the tubular body 30 and calked thereon to fix the tubular body 30 to the mounting member 4a or 4b. Thereafter, the free portion of the tubular body 30 is reversed and fitted on the joint surface 28b of the mounting member. The clamp sleeve 32b is fitted on the reversed free portion of the tubular body 30 and caulked thereon to fix the tubular body 30 to the mounting member, thereby forming the anchoring structure 8.

The mounting members 4a and 4b are provided with supply and exhaust passages 30a and 30b, respectively, for supplying the pressurized fluid into and exhausting from the anchoring structure 8. In this embodiment, each mounting member is provided with the two supply and exhaust openings so that a great amount of the pressurized fluid can be supplied into and exhausted from the anchoring structure in a relatively short period of time. However, the number of the openings may be increased or decreased, if required. Although the anchoring structure is the tubular body made of rubber or a rubber-like elastomer, a tubular body reinforced by reinforcing layers may be used in consideration that the tubular body is repeatedly expanded and abuts against an inner wall of a pipe to which the device is applied.

According to the invention, the elastic member 6 is arranged between the mounting members 4a and 4b which are connected to the respective ends of the elastic contractable body 2 and have the anchoring structure 8, respectively. The elastic member is the compression spring 6 in this embodiment, which is required only to have a function elastically deformed by both the mounting members 4a and 4b moving toward each other owing to the axially contracting movement of the elastic contractable body 2 when supplying the pressurized fluid and on the other hand urging the mounting members 4a and 4b away from each other owing to the release of the elastic energy in response to the decrease of the contractive force of the elastic contractable body 2 due to the exhaust of the pressurized fluid from the elastic contractable body 2. In order to facilitate arranging the compression spring 6 between the mounting members in this embodiment, rims 34 are provided on the ends of the mounting members opposed to each other as shown in FIGS. 3a and 3b.

In order to make smooth the movement of the device in a tube in this embodiment, rolling means 36 as shown in FIG. 1b are used utilizing the clamp sleeves 32b. An outer diameter of the device including the rolling means 36 is preferably smaller than outer diameters of the anchoring means 8 expanded by the pressurized fluid supplied thereinto or an inner diameter of the tube in which the device travels, but is larger than a outer diameter of the device including the anchoring contracted by the exhaust of the pressurized fluid. The numbers and positions of the rolling means may be determined according to used conditions of the device.

The respective steps of operation of the traveling device according to the invention are shown in FIGS. 5a-5f. FIG. 5a illustrates the traveling device arranged in a tube in which the device travels.

The supply and exhaust passages 30a formed in the mounting member 4a are connected to each other through a connecting pipe 40. On the other hand, to the supply and exhaust passages 30b, formed in the mounting member 4b, is connected a supply and exhaust pipe 42 which is connected to the pressure source (not shown) and includes valve means, for example, a three-way valve for controlling the supply and exhaust of the pressurized fluid. One end of a further connecting pipe 44 spaced from and extending in parallel with the elastic contractable body is connected to one of the supply and exhaust openings 30a of the mounting member 4a, and the other end of the further connecting pipe 44 is connected to a through-aperture (not shown) formed in the mounting member 4b. To the other end of the through-aperture is connected a supply and exhaust pipe 46 including a three-way valve.

An arrow A in FIG. 5b illustrates a direction in which the device is to be traveled. First, the pressurized fluid is supplied into the anchoring structure 8 forward positioned through the supply and exhaust pipe 46 so as to expand the anchoring structure 8 so that the forward positioned anchoring structure 8 is pressed to an inner wall of the tube so as to be held thereat.

The pressurized fluid is then supplied into the elastic contractable body 2 through a supply and exhaust pipe 48 which is connected to a suitable pressure source and includes valve means such as a three-way valve for controlling the supply and exhaust of the pressurized fluid so as to expand the elastic contractable body in diameter and contract in axial directions. The contractive force caused in the elastic contractable body 2 depends upon pressure of the pressurized fluid. Therefore, the compression spring 6 can be compressed by suitably selecting the pressure of the pressurized fluid. Accordingly, the mounting member rearward positioned on the side of the supply and exhaust pipe 48 moves forward compressing the compression spring 6 as shown in FIG. 5c.

The pressurized fluid is then supplied through the supply and exhaust pipe 42 into the anchoring structure 8 rearward positioned on the side of the supply and exhaust pipe 42 to expand the anchoring structure 8 so that the anchoring structure 8 is pressed to the inner wall of the tube and fixed thereat as shown in FIG. 5d.

The pressurized fluid is then exhausted through the pipe 46 from the forward positioned anchoring structure 8 so that the anchoring structure contracts with the aid of its elastic restoring force as shown in FIG. 5e.

The pressurized fluid is then exhausted through the pipe 48 from the elastic contractable body 2 to eliminate the contractive force so that the forward positioned mounting member is forward moved by the action of the elastic force stored in the compression spring.

By suitably supplying the pressurized fluid into and exhausting it from the respective anchoring structure and the elastic contractable body in the manner above described, the device according to the invention can be moved in the forward direction in the tube shown by the arrow A.

As can be seen from the above description, for the purpose of retracting the traveling device, the order for supplying the pressurized fluid into and exhausting from the respective anchoring structure may be changed.

Various changes and modifications may be made in the invention without departing from the spirit and scope thereof. Although the single elastic contractable body is used in this embodiment, a plurality of the elastic contractable bodies may be used. Moreover, in order to apply the invention to a tube having a great diameter, a plurality of traveling devices as above described may be used, whose respective mounting members are fixed to a pair of annular members corresponding in size to a diameter of tube in which the traveling device travels.

As can be seen from the above explanation, the traveling device according to the invention utilizes an elastic contractable body which is of light weight and very small in cross-sectional dimension in comparison with other actuators and capable of causing contractive forces in axial directions by expanding in diameter when pressurized fluid is supplied into the elastic contractable body. Therefore, the reduction of size and weight of the traveling device can be accomplished. Accordingly, the traveling device according to the invention can be applied to tubes having small diameters of the order of $2^B$ (JIS G3452, nominal diameter: 2"). Moreover, the traveling device according to the invention is applicable to vertically arranged tubes to which traveling devices of the prior art are scarcely applicable.

Contrasted with traveling devices using wheels or pawls of the prior art, the traveling device according to the invention is fixedly held in a tube by means of anchoring members expanded by supplied pressurized fluid. Therefore, contacting areas to an inner wall of the tube are large and hence the compressive stresses acting upon the inner wall are small, so that the device can be securely held without slipping and the inner wall is not damaged.

According to the invention, moreover, the traveling device utilizes the elastic contractable body as an actuator. Accordingly, there is no risk of the occurrence of sparks and heating so that the traveling device according to the invention can be applicable in an explosive atmosphere. Moreover, the traveling device according to the invention can travel at a very low speed without any trouble by adjusting the supplying and exhausting of the pressurized fluid. Furthermore, if the pressurized fluid is compressed air, a plant using the devices according to the invention is not detrimentally affected even if the devices are damaged in comparison with devices using hydraulic systems of the prior art.

FIGS. 6a and 6b are a front elevation of another embodiment of the traveling device traveling along an outside of a tube and a partially cut away side view thereof. A pair of frames 51 are arranged spaced apart from each other and annular having an inner diameter larger than a tube B along which the device travels. Each frame 51 is made splitable so that the frame is applicable to a tube at a mid portion thereof. In practice, each frame 51 is divided into two segments whose one ends are pivotally connected by a hinge 52 and the other ends are connected by known means, for example, a connecting plate 53 and set screws. In the pair of frames, four elastic contractable bodies 54 are arranged in parallel with axial directions of the frames and equally spaced from each other in circumferential directions of the frames.

The elastic contractable bodies 54 shown in FIGS. 2b and 2c are used in this embodiment.

To the ends of these elastic contractable bodies are connected mounting members 61a and 61b shown in section in FIGS. 7a and 7b. The mounting member 61a includes an aperture 62a formed in axial directions for receiving one end 20a of the closure member and is integrally connected to one end of the elastic contractable body by means of a set screw 63a screwed into the female screw 14c of the closure member. The mounting member 61b shown in FIG. 7b also includes an aperture 62b formed in axial directions for receiving the other closure member 14 and is integrally connected to the other end of the elastic contractable body by a snap ring 63b shown in phantom lines received in the annular groove 14b of the closure member 14.

The mounting members 61a and 61b have on their outer circumferences anchoring members 64 which expand when supplied with the pressurized fluid thereinto. In this embodiment, apart of a tubular body 65 made of rubber or a rubber-like elastomer is mounted on an outer circumference of the mounting member 61a or 61b. A clamp sleeve 66a is fitted on the tubular body 65 and caulked thereon to fix the part of the tubular body 65 to the mounting member 61a or 61b. Thereafter the remaining portion of the tubular body 65 is reversed and fitted on the mounting member. A further clamp sleeve 66b is fitted on the reversed free portion of the tubular body 65 and calked thereon to fix the tubular body 65 to the mounting member.

The pressurized fluid is supplied into the anchoring member through supply and exhaust passages 67a and 67b. In this embodiment, each the mounting member is provided with the two supply and exhaust passages so that a great amount of the pressurized fluid can be supplied into and exhausted from the anchoring means for a short period of time. However, the number of the openings may be increased or decreased, if required. Although the anchoring member is the tubular body made of rubber or a rubber-like elastomer, a tubular body provided with wear resistant reinforcing layers may be preferably used because the tubular body abuts against an outer surface of the tube when supplied with the pressurized fluid. In order to prevent the anchoring member from being damaged by relatively sharp protrusions on the outer surface of the tube, on the anchoring member may be provided a protective cover made of a plastic, rubber or a rubber-like elastomer formed with notched grooves permitting the anchoring member to be expanded without detrimentally affecting the expansion of the anchoring member.

According to the invention, an elastic member 68 is arranged between the mounting members 61a and 61b connected to the respective ends of the elastic contractable body 54. The elastic member is a compression coil spring in this embodiment, which is required only to have a function elastically deformed by the mounting members 61a and 61b moving toward each other owing to the axially contracting movement of the elastic contractable body 54 when applying the pressurized fluid and on the other hand urging the mounting members 61a and 61b away from each other owing to the regain of the elastic contractable body due to the decrease of the contractive force of the elastic contractable body owing to the exhaust of the pressurized fluid therefrom. In order to ensure the arrangement of the compression spring 68 between the mounting members in this embodiment, rims 80 are provided on ends of the mounting members. However, as the elastic contractable body limits the movement of the mounting members away from each other, ends of the compression spring may only be fitted on outer circumferences of the mounting members.

The ends of the elastic contractable body provided with the anchoring member 64 and the elastic member 68 are fixed to inner walls of the annular frames above described. For this purpose in this embodiment, the clamp sleeves 66 are embraced by substantially U-shaped mounting brackets 69 corresponding to shapes of the clamp sleeves 66b. The U-shaped mounting brackets 69 are fixed to the inner walls of the frames by means of set screws. In.order to securely fix the mounting brackets and the mounting members having the clamp sleeves 66b, the mounting brackets are formed in concaved portions with internal thread portions (not shown) spaced apart from each other, into which set screws are threadedly screwed to prevent any relative movement therebetween.

As shown in FIG. 6a, to the outer surfaces of the frames 51 are fixed support brackets 70 extending therefrom at locations corresponding to the anchoring members 64. The support brackets 70 substantially U-shaped restraint plates 71 are secured with their openings directing radially inwardly of the annular shaped frames. With this arrangement, the anchoring members 64 are caused to be deformed at least inwardly of the frames when expanded, thereby securely urging and engaging the anchoring members 64 against the outer surface of the tube along which the device travels.

In this embodiment, moreover, in order to facilitate the advance and retreat of the device, rolling bodies 72 may be provided on the inner walls of the frames as shown in FIG. 6a, although they are not essential. An inner diameter of the device including the rolling bodies is preferably larger than an inner diameter of the device including the anchoring members 64 expanded by supplying the pressurized fluid thereinto or an outer diameter of a tube along which the device travels. The number and positions of the rolling bodies may be determined according to used conditions of the device.

Respective steps of the operation of the device of this embodiment will be explained by referring to FIGS. 8a–8e. Before starting the operation, the supply and exhaust passages 67a formed in the mounting member 61a are connected to each other through a connecting pipe 73. On the other hand, to the other mounting member 61b is connected a supply and exhaust pipe 74 which is connected to the pressure source (not shown) and includes valve means, for example, a three-way valve for controlling the supply and exhaust of the pressurized fluid. One end of a further connecting pipe 75, spaced from and extending in parallel with the elastic contractable body, is connected to one of the supply and exhaust passages 67a of the mounting member 61a. The other end of the further connecting pipe 75 is connected to a through-aperture (not shown) formed in the mounting member 61b. To the other end of the through-aperture is connected a supply and exhaust pipe 76 including a control valve for controlling the supply and exhaust of the pressurized fluid.

FIG. 8a illustrates the traveling device arranged about at tube along which the device travels. It is assumed the device advances in a direction shown by an arrow in FIG. 8a. The pressurized fluid is supplied into the anchoring member forward positioned to expand the anchoring member so that the forward positioned anchoring member is pressed to an outer surface of the tube shown in phantom line B so as to fix the frame 51 forward positioned relative to the tube.

The pressurized fluid is then supplied into each the elastic deformable body 54 so as to expand it in diameter and contract in axial directions, so that the rearward positioned frame 51 is forwardly attracted as shown in FIG. 8b. The pressurized fluid is then supplied into the rearward positioned anchoring member 64 so as to expand it so that the rearward positioned anchoring member 64 is brought into engagement with the outer surface of the tube and the rearward positioned frame 51 is also fixed to the tube as shown in FIG. 8c.

The pressurized fluid is then exhausted from the forward positioned anchoring member to disengage it from the tube, and the pressurized fluid is also exhausted from the elastic contractable body 54 so that the forward positioned frame 51 is pushed forward by the elastic restoring force of the compression spring 68 as shown in FIG. 8d.

Thereafter, the pressurized fluid is again supplied into the forward positioned anchoring member, and the pressurized fluid is exhaust from the rearward positioned anchoring member. In this manner, the pressurized fluid is applied to the elastic contractable body and the anchoring members in the sequence above described to advance the traveling device along the tube.

As can be seen from the above explanation, if it is required to restract the device, the sequence of the supply and exhaust of the pressurized fluid from the anchoring members may be changed.

In the above embodiment, the supply and exhaust of the pressurized fluid into and out of the forward and rearward positioned anchoring members and the elastic contractable body are carried out in a constant cycle. However, if the timing of the supply and exhaust of the pressurized fluid into and out of the elastic contractable body is changed, the advancing direction of the traveling device can be varied. Therefore, the traveling device according to the invention can be sufficiently applied to a curved tube as schematically shown in FIG. 9. Such an application to a curved tube is possible because the anchoring members extend sufficient distances and contact the tube with sufficient areas when supplied with the pressurized fluid so that the traveling device can be applied to the tube even if clearances between the device and the tube are varied, and further rigidities of the elastic constractable body and the elastic member in transverse directions are relatively smaller than those in longitudinal directions.

Figure 10A:
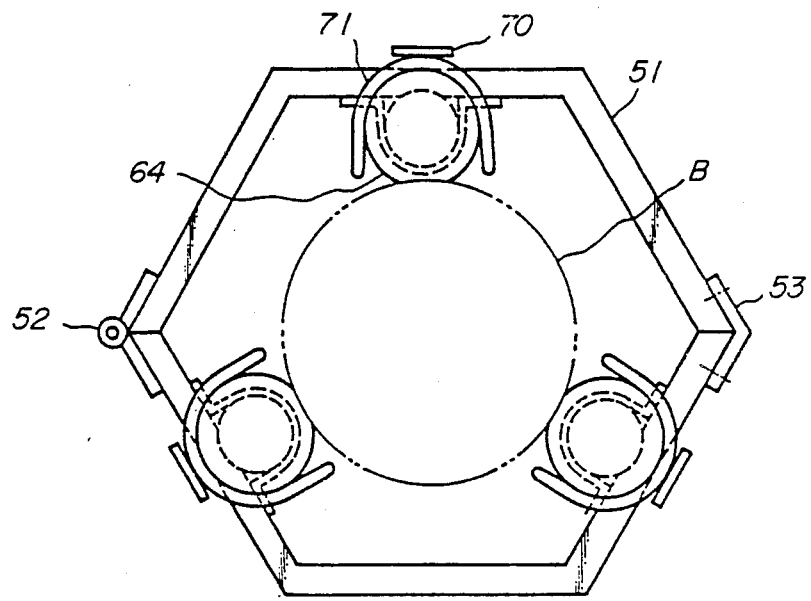
FIGS. 10a and 10b are front views illustrating other embodiments of the invention.
Figure 10B:
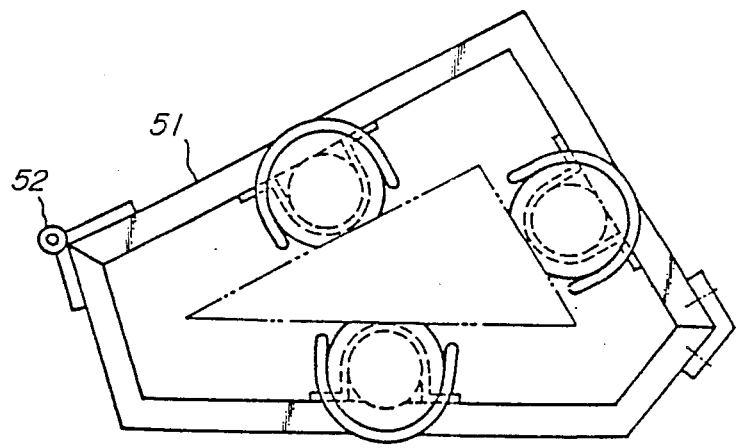

Moreover, the traveling device according to the invention is not limited to the embodiments above described. The elastic contractable body, the anchoring members and the elastic member may be separately and directly fixed to the frames. Moreover, the elastic contractable body and the anchoring members may be integrally fixed to the frames and the elastic member may be separately arranged between the frames. In case that anchoring forces of the anchoring members are required to increase for loading heavy objects such as inspecting instruments, the number of the anchoring members may be increased. If increased advancing force is required, the numbers of the elastic contractable body and the elastic member may be increased. The numbers and located positions of the anchoring members, the elastic contractable body and the elastic member may be varied on the frames, if required. The traveling device can be applicable to tubes, columns and the like having various cross-sections by shapes of the frames as shown in FIGS. 10a and 10b. In this manner, the invention of the present case can be modified without departing from the spirit and scope of the invention.

As can be seen from the above detailed explanation, the traveling device according to the invention comprises the anchoring members embracing a tube outwardly by expanding the anchoring members when supplied with the pressurized fluid, and the elastic contractable bodies which drive the device along the tube and are of air bag type much lighter than other actuators. Therefore, the device is light and applicable to any tubes having uneven surfaces and can be used in an explosive atmosphere. In addition, the traveling device according to the invention is applicable to tubes which are curved or flexible, because the device according to the invention is not detrimentally affected by clearances between the tube and the device and the device is easily deformed in transverse directions. By changing shapes of the frames, the device can be applicable to tubes of various cross-sections. Therefore, the traveling device according to the invention has a very wide range in which it is applicable so that the device is very useful in industries.

FIGS. 11a and 11b are respectively a front elevation of a further embodiment of the traveling device traveling along an inside of a tube and a partially cut away side view thereof. A pair of frames 101 are arranged axially spaced apart from each other and annular having an inner diameter smaller than a tube C along which the device travels. In the pair of frames, four elastic contractable bodies 104 are arranged in parallel with axial directions of the frames and equally spaced from each other in circumferential directions of the frames.

The elastic contractable bodies 54 shown in FIGS. 2b and 2c are used in this embodiment.

Mounting members used in this embodiment are substantially similar to those of the preceding embodiment. Therefore, the mounting members 111a and 111b and other parts will be explained by referring to FIGS. 7a and 7b in which components of this embodiment are designated by reference numerals in brackets.

To the ends of these elastic contractable bodies are connected mounting members 111a and 111b shown in section in FIGS. 7a and 7b. The mounting member 111a includes an aperture 112a formed in axial directions for receiving one end 20a of the closure member and is integrally connected to one end of the elastic contractable body by means of a set screw 113a screwed into the female screw 14c of the closure member. The mounting member 111b shown in FIG. 7b also includes an aperture 112b formed in axial directions for receiving the other closure member 14 and is integrally connected to the other end of the elastic contractable body by a snap ring 113b shown in phantom lines received in the annular groove 14b of the closure member 14.

The mounting members 111a and 111b have on their outer circumferences anchoring members 114 which expand when supplied with the pressurized fluid thereinto. In this embodiment, a part of a tubular body 115 made of rubber or a rubber-like elastomer is mounted on an outer circumference of the mounting member 111a or 111b. A clamp sleeve 116a is fitted on the tubular body 115 and calked thereon to fix the part of the tubular body 115 to the mounting member 111a or 111b. Thereafter the remaining portion of the tubular body 115 is reversed and fitted on the mounting member. A further clamp sleeve 116b is fitted on the reversed free portion of the tubular body 115 and calked thereon to fix the tubular body 115 to the mounting member.

The pressurized fluid is supplied into the anchoring member through supply and exhaust passages 117a and 117b. In this embodiment, each mounting member is provided with the two supply and exhaust passages so that a great amount of the pressurized fluid can be supplied into and exhausted from the anchoring member 114 for a short period of time. However, the number of the openings may be increased or decreased, if required. Although the anchoring member is the tubular body made of rubber or a rubber-like elastomer, a tubular body provided with wear-resistant reinforcing layers may be preferably used because the tubular body abuts against an inner surface of the tube when supplied with the pressurized fluid. As an alternative, a tubular body may be used which has cord layers embedded therein in directions in practice in parallel with the axial direction. The directions of the embedded cord layers do not detrimentally affect the expanding deformation in diameter. In order to prevent the anchoring members from being damaged by relatively sharp protrusions on the inner surface of the tube, on the anchoring means may be provided a protective cover made of a plastic, rubber or a rubber-like elastomer formed with notched grooves permitting the anchoring member to be expanded without detrimentally affecting the expansion of the anchoring means.

According to the invention, an elastic member 118 is arranged between the mounting members 111a and 111b connected to the respective ends of the elastic contractable body 104. The elastic member is a compression coil spring in this embodiment, which is required only to function elastically, deformed by the mounting members 111a and 111b, moving toward each other owing to the axially contracting movement of the elastic contractable body 104 when applying the pressurized fluid and on the other hand urging the mounting members 111a and 111b away from each other owing to the regain of the elastic contractable body due to the decrease of the contractive force of the elastic contractable body owing to the exhaust of the pressurized fluid therefrom. In order to ensure the arrangement of the compression spring 118 between the mounting members in this embodiment, rims 130 are provided on ends of the mounting members. However, as the elastic contractable body limits the movement of the mounting members away from each other, ends of the compression spring may only be fitted on outer circumferences of the mounting members.

The ends of the elastic contractable body provided with the anchoring means 114 and the elastic member 118 are fixed to outer walls of the annular frames above described. For this purpose in this embodiment, the clamp sleeves 116b are embraced by substantially U-shaped mounting brackets 119 corresponding to shapes of the clamping sleeves 116b. The U-shaped mounting brackets 119 are fixed to the outer walls of the frames by means of set screws as shown in FIG. 11b. In order to securely fix the mounting brackets 119 an the mounting members having the clamp sleeves 116b, the mounting brackets 119 are formed in concaved portions with internal thread portions (not shown) spaced apart from each other, into which set screws are threadedly screwed to prevent any relative movement therebetween.

As shown in FIG. 11a to the inner surfaces of the frames 101 are fixed support brackets 120 extending axially and outwardly of the frame at locations corresponding to the anchoring members 114. To the support brackets 120 are secured substantially U-shaped restraint plates 121 with their openings directing radially outwardly of the annular shaped frames. With this arrangement, the anchoring members 114 are caused to be deformed at least outwardly of the frames when expanded, thereby securely urging and engaging the anchoring members 114 against the outer surface of the tube along which the device travels.

In this embodiment, moreover, in order to facilitate the advance and retreat of the device, rolling bodies 122 may be provided on the outer walls of the frames as shown in FIG. 11a, although they are not essential. An outer diameter of the device including the rolling bodies is preferably smaller than an inner diameter of the device including the anchoring members 114 expanded by supplying the pressurized fluid thereinto or an inner diameter of a tube along which the device travels. The numbers and positions of the rolling bodies may be determined according to used conditions of the device.

Respective steps of the operation of the device of this embodiment will be explained by referring to FIGS. 12a–12e. The supply and exhaust passages 117a in the mounting member 111a are connected to each other through a connecting pipe 123. On the other hand, to the other mounting member 111b is connected a supply and exhaust pipe 124 which is connected to the pressure source (not shown) and includes valve means, for example, a three-way valve for controlling the supply and exhaust of the pressurized fluid. One end of a second connecting pipe 125 spaced from and extending in parallel with the elastic contractable body is connected to one of the supply and exhaust passages 117a of the mounting member 111a, and the other end of the second connecting pipe 125 is connected to a through-aperture (not shown) formed in the mounting member 111b. To the other end of the through-aperture is connected a supply and exhaust pipe 126 including a control valve for controlling the supply and exhaust of the pressurized fluid.

FIG. 12a illustrates the traveling device arranged in a tube along which the device travels. It is assumed to advance the device in a direction shown by an arrow in FIG. 12a. The pressurized fluid is supplied into the anchoring member 114 forward positioned to expand the anchoring member so that the forward positioned anchoring member is pressed to an inner surface of the tube shown in phantom line C so as to fix the frame 101 forward positioned relative to the tube.

The pressurized fluid is then supplied into each the elastic deformable body 104 so as to expand it in diameter and contract in axial directions so that the rearward positioned frame 101 is forwardly attracted as shown in FIG. 12b. The pressurized fluid is then supplied into the rearward positioned anchoring member 114 so as to expand it so that the rearward positioned anchoring member 114 is brought into engagement with the inner surface of the tube and the rearward positioned frame 101 is also fixed to the tube as shown in FIG. 12c.

The pressurized fluid is then exhausted from the forward positioned anchoring member to disengage it from the tube, and the pressurized fluid is also exhausted from the elastic contractable body 104 so that the forward positioned frame 101 is pushed forward by the elastic restoring force of the compression spring 118 as shown in FIG. 12d.

Thereafter, the pressurized fluid is again supplied into the forward positioned anchoring member, and the pressurized fluid is exhaust from the rearward positioned anchoring member. In this manner, the pressurized fluid is applied to the elastic contractable body and the anchoring members in the sequence above described to advance the traveling device along the tube.

As can be seen from the above explanation, if it is required to retract the device, the sequence of the supply and exhaust of the pressurized fluid from the anchoring members may be changed.

In the above embodiment, the supply and exhaust of the pressurized fluid into and out of the forward and rearward positioned anchoring members and the elastic contractable body are carried out in a constant cycle. However, if the timing of the supply and exhaust of the pressurized fluid into and out of the elastic contractable body is changed, the advancing direction of the traveling device can be varied. Therefore, the traveling device according to the invention can be sufficiently applied to a curved tube as schematically shown in FIG. 13. Such an application to a curved tube is possible because the anchoring members extend sufficient distances and contact the tube with sufficient areas when supplied with the pressurized fluid so that the traveling device can be applied to the tube even if clearances between the device and the tube are varied, and further rigidities of the elastic contractable body and the elastic member in transverse directions are relatively smaller than those in longitudinal directions.

Figure 14:
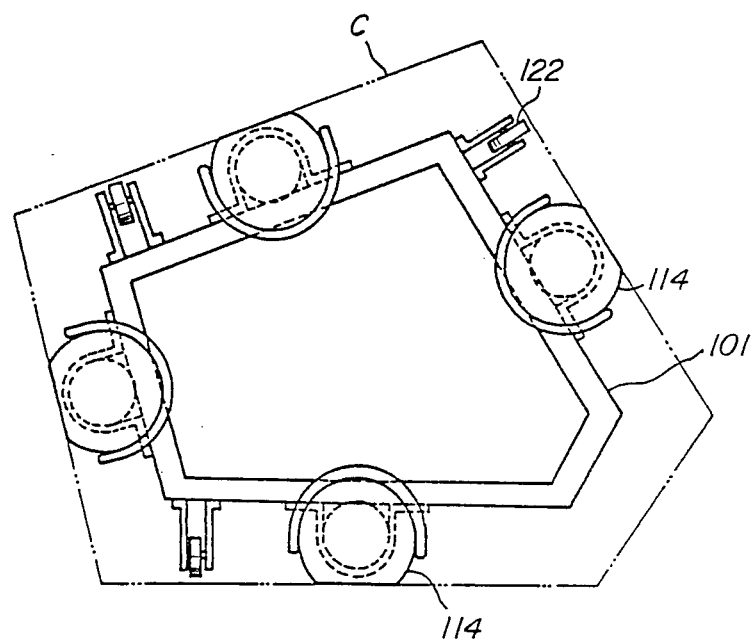
FIG. 14 is a front elevation illustrating a further embodiment of the invention.

Moreover, the traveling device according to the invention is not limited to the embodiments above described. The elastic contractable body, the anchoring members and the elastic member may be separately and directly fixed to the frames. Moreover, the elastic contractable body and the anchoring members may be integrally fixed to the frames and the elastic member may be separately arranged between the frames. In case that anchoring forces of the anchoring members are required to increase for loading heavy objects such as inspecting instruments, the number of the anchoring members may be increased. If increased advancing force is required, the numbers of the elastic contractable body and the elastic member may be increased. The numbers and located positions of the anchoring members, the elastic contractable body and the elastic member may be varied on the frames, if required. The traveling device can be applicable to tubes columns and the like having various cross-sections by shapes of the frames as shown in FIG. 14. Moreover, it is possible to advance and retract the traveling device along concaved surfaces of walls. In this manner, the invention of the present case can be modified without departing from the spirit and scope of the invention.

As can be see from the above detailed explanation, the traveling device according to the invention comprises the anchoring members expanding when supplied with the pressurized fluid and engage a tube along which the device is to be traveled, and the elastic contractable bodies which drive the device along the tube and are of air bag type much lighter than other actuators. Therefore, the device is light and applicable to any tubes having uneven surfaces and can be used in an explosive atmosphere. Moreover, the traveling device according to the invention can be applied to tubes having small diameters of the order of $2^B$ (JIS G3452, nominal diameter: 2"). Moreover, the traveling device according to the invention is applicable to vertically arranged tubes to which traveling devices of the prior art are scarcely applicable.

Contrasted with traveling devices using wheels or pawls of the prior art, the traveling device according to the invention is fixedly held in a tube by means of anchoring means expanded by supplied pressurized fluid. Therefore, contacting areas to an inner wall of the tube are large and hence the compressive stresses acting upon the inner wall are small, so that the device can be securely held without slipping and the inner wall is not damaged. In addition, the traveling device according to the invention is applicable to tubes which are curved or flexible, because the device according to the invention is not detrimentally affected by clearances between the tube and the device and the device is easily deformed in transverse directions. By changing shapes of the frames, the device can be applicable to tubes of various cross-sections. Therefore, the traveling device according to the invention has a very wide range in which it is applicable so that the device is very useful in industry.

What is claimed is:

1. A device for traveling along an elongated member, comprising; an elastic contractible body that expands; said body having a principle axis defining an axial direction and an outward radial direction perpendicular to a said axial direction, an expansion of said body in radial direction causing a contractive force in axial directions when the interior of the body is supplied with pressurized fluid, mounting members connected to respective ends of said elastic contractible body, an elastic member arranged between said mounting members causing a force resisting to said contractive force of said elastic contractible body, and anchoring means fixed to said mounting members that expand when the interior is supplied with pressurized fluid, thereby allowing the traveling device to travel along said elongated member by supplying the pressurized fluid into and exhausting from the elastic contractible body in coordination with alternately supplying the pressurized fluid into and exhausting from the anchoring means.

2. A traveling device as set forth in claim 1, further comprising rolling means for helping smooth movement of the device.

3. A traveling device as set forth in claim 1, wherein said elastic contractable body comprises a tubular body made of an elastomer, a reinforcing braided structure made of high strength fibers covering and reinforcing said tubular body, and closure members closing ends of the tubular body.

4. A traveling device as set forth in claim 1, wherein said elastic member is a compression coil spring.

5. A traveling device as set forth in claim 1, wherein said anchoring means comprises a tubular body made of an elastomer having one end clamped to one of said mounting members, said tubular body having the other end turned inside out and clamped to said mounting member.

* * * * *